(12) United States Patent
Fukushi et al.

(10) Patent No.: US 7,782,024 B2
(45) Date of Patent: Aug. 24, 2010

(54) SWITCHING CONTROL CIRCUIT

(75) Inventors: Iwao Fukushi, Gunma-ken (JP);
Masahiro Maruki, Gunma-ken (JP);
Takashi Noma, Nagaokakyo (JP)

(73) Assignees: Sanyo Electric Co., Ltd., Osaka (JP);
Murata Manufacturing Co., Ltd., Kyoto (JP)

( * ) Notice: Subject to any disclaimer, the term of this patent is extended or adjusted under 35 U.S.C. 154(b) by 202 days.

(21) Appl. No.: 12/064,622

(22) PCT Filed: Apr. 4, 2007

(86) PCT No.: PCT/JP2007/057550
§ 371 (c)(1),
(2), (4) Date: Aug. 5, 2008

(87) PCT Pub. No.: WO2007/114466
PCT Pub. Date: Oct. 11, 2007

(65) Prior Publication Data
US 2009/0039851 A1    Feb. 12, 2009

(30) Foreign Application Priority Data
Apr. 5, 2006    (JP)    ............... 2006-104166

(51) Int. Cl.
*G05F 1/613*    (2006.01)
(52) U.S. Cl. .............. 323/224; 323/222; 323/284; 323/285; 323/901
(58) Field of Classification Search .............. 323/224, 323/282, 284, 285, 901, 222
See application file for complete search history.

(56) References Cited

U.S. PATENT DOCUMENTS 5,831,418 A * 11/1998 Kitagawa ............... 323/222
5,966,003 A * 10/1999 Takimoto et al. .......... 323/224

(Continued)

FOREIGN PATENT DOCUMENTS

JP    10-295074    11/1998

(Continued)

OTHER PUBLICATIONS

Japan Texas Instruments Incorporated, "Low-inpout voltage mode synchronouse rectification back controller", URL: http://www.tij.co.jp/jsc/ds/SLUS585A.pdf.

*Primary Examiner*—Bao Q Vu
(74) *Attorney, Agent, or Firm*—SoCal IP Law Group LLP; Steven C. Sereboff; John E. Gunther

(57) ABSTRACT

A switching control circuit comprises: an error amplifying circuit configured to output an error voltage obtained by amplifying an error between a feedback voltage corresponding to an output voltage and a lower voltage selected out of a first reference voltage increasing with time passage and a second reference voltage used as a reference for a target level; a comparison circuit configured to output a comparison signal obtained by comparing the feedback voltage with the error voltage output from the error amplifying circuit; and a drive circuit configured to output first and second control signals for controlling first and second transistors, respectively, in order to turn the output voltage to the target level by complementarily turning on and off the first and second transistors, after the error voltage exceeds the feedback voltage, based on the comparison signal output from the comparison circuit.

8 Claims, 7 Drawing Sheets

U.S. PATENT DOCUMENTS

| | | | |
|---|---|---|---|
| 6,091,234 A * | 7/2000 | Kitagawa | 323/244 |
| 6,169,392 B1 * | 1/2001 | Kitagawa | 323/282 |
| 6,420,858 B1 * | 7/2002 | Kitagawa et al. | 323/282 |
| 6,671,143 B2 * | 12/2003 | Hwang | 361/18 |
| 6,674,272 B2 * | 1/2004 | Hwang | 323/284 |
| 6,737,845 B2 * | 5/2004 | Hwang | 323/284 |
| 6,958,595 B2 * | 10/2005 | Niiyama et al. | 323/282 |
| 7,391,190 B1 * | 6/2008 | Rajagopalan | 323/271 |
| 7,508,183 B2 * | 3/2009 | Chen | 323/288 |

FOREIGN PATENT DOCUMENTS

| | | |
|---|---|---|
| JP | 11-220874 | 8/1999 |
| JP | 2006-014559 | 1/2006 |

\* cited by examiner

SWITCHING CONTROL CIRCUIT

CROSS-REFERENCE TO RELATED APPLICATION

This application is a National Stage Application filed under 35 U.S.C. 371 and claims the benefit of priority to Patent Cooperation Treaty Application PCT/JP2007/057550, filed Apr. 4, 2007, which claims priority to Japanese Patent Application No. 2006-104166 filed Apr. 5, 2006, both of which full contents are incorporated herein by reference.

BACKGROUND OF THE INVENTION

1. Field of the Invention

The present invention relates to a switching control circuit.

2. Description of the Related Art

A step-down DC-DC converter for generating a target level output voltage lower than an input voltage is incorporated in various electronic devices. FIG. 8 depicts the general configuration of a step-down DC-DC converter. The DC-DC converter 100 includes N-channel MOSFETs 110 and 111, an inductor 120, and a capacitor 121. An input voltage Vin is applied to the drain of the N-channel MOSFET 110. When the N-channel MOSFET 110 is turned on and the N-channel MOSFET 111 is turned off, the input voltage Vin is applied to the inductor 120, which charges the capacitor 121, thus raises an output voltage Vout. Subsequently, when the N-channel MOSFET 110 is turned off and the N-channel MOSFET 111 is turned on, accumulated energy on the inductor 120 causes current to flow through a loop formed of the N-channel MOSFET 111, the inductor 120, and the capacitor 121. This causes the capacitor 121 to discharge, thus lowers the output voltage Vout. In this manner, in the DC-DC converter 100, the N-channel MOSFETs 110 and 111 are turned on and off in proper timing to control the output voltage Vout to turn it into the target level voltage.

The DC-DC converter 100 also includes resistors 125 and 126, an error amplifying circuit 130, a capacitor 131, a resistor 132, a power source 135, a current source 136, a capacitor 137, a triangular wave generator 140, a comparator 150, a buffer 151, and an inverter 152. These components serve as a circuit that controls switching by the N-channel MOSFETs 110 and 111.

To a negative input terminal of the error amplifying circuit 130, a feedback voltage Vf is applied, which is obtained by dividing the output voltage Vout with the resistors 125 and 126. To one positive input terminal of the error amplifying circuit 130, a reference voltage Vref from the power source 135 is applied, which reference voltage Vref is a reference for the target voltage level. To the other positive input terminal of the error amplifying circuit 130, a voltage Vss is applied, which is generated as a result of charging the capacitor 137 with currents from the current source 136. The error amplifying circuit 130 outputs a voltage Ve that is given by amplifying an error between a lower voltage selected out of two voltages applied to two positive input terminals and the feedback voltage Vf applied to the negative input terminal. The capacitor 131 and the resistor 132 are provided to cause the error amplifying circuit 130 to make an integral action.

The comparator 150 compares the level of a voltage Vt, which is output from the triangular wave generator 140 and changes in a shape of a triangular wave, with the level of the error voltage Ve output from the error amplifying circuit 130. The comparator 150 keeps outputting an H level signal while the error voltage Ve is higher than the voltage Vt, and keeps outputting an L level signal while the error voltage Ve is lower than the voltage Vt. When the comparator 150 outputs an H level signal, the H level signal is input to the gate of the N-channel MOSFET 110 via the buffer 151 to turn on the N-channel MOSFET 110 as an L level signal is input to the N-channel MOSFET 111 via the inverter 152 to turn off the N-channel MOSFET 111. When the comparator 150 outputs an L level signal, on the other hand, the L level signal is input to the gate of the N-channel MOSFET 110 via the buffer 151 to turn off the N-channel MOSFET 110 as an H level signal is input to the N-channel MOSFET 111 via the inverter 152 to turn on the N-channel MOSFET 111.

Specifically, when the feedback voltage Vf is lower than the reference voltage Vref or the voltage Vss, the voltage Ve rises to increase a ratio of output of an H level signal from the comparator 150, which leads to a rise in the output voltage Vout. When the feedback voltage Vf is higher than the reference voltage Vref or the voltage Vss, the voltage Ve falls to increase a ratio of output of an L level signal from the comparator 150, which leads to a fall in the output voltage Vout. In this manner, in the DC-DC converter 100, a signal output from the comparator 150 is put under PWM (Pulse Width Modulation) control so as to turn the feedback voltage Vf into a lower voltage selected out of the voltage Vref and the Voltage Vss.

If control is started to turn the reference voltage Vf into the voltage Vref at the start of operation of the DC-DC converter 100, a process of a sharp increase in the output voltage Vout causes an excess current, which breaks the N-channel MOSFETs 110 and 111. To prevent this, the Vss voltage is used in the DC-DC converter 100 to achieve soft start through which the output voltage Vout is gradually raised.

A state where the output voltage Vout is not at zero level, i.e., a pre-bias state may occur at the start of the DC-DC converter 100. The pre-bias state results, for example, when the capacitor 121 discharges incompletely following the end of the previous operation of the DC-DC converter 100 or when current leaks from a device connected to the output side of the DC-DC converter 100.

If the DC-DC converter 100 is started in the pre-bias state, the output voltage Vout falls because the feedback voltage Vf is higher than the voltage Vss in the pre-bias state, so that the N-channel MOSFET 111 is turned on and the N-channel MOSFET 110 is turned off. As a result, current flows through the loop formed of the capacitor 121, the inductor 120, and the N-channel MOSFET 111 to cause the capacitor 121 to discharge, which lowers the output voltage Vout. Then, when the N-channel MOSFET 110 is turned on and the N-channel MOSFET 111 is turned off, accumulated energy on the inductor 120 causes current to flow backward from the inductor 120 toward the drain of the N-channel MOSFET 110 at the input side of the DC-DC converter 100. This action of energy backflow from the output side to the input side is called a regenerative action.

When the regenerative action is made, the direction of the voltage of the inductor 120 is the same as that of a pre-bias voltage, so that a voltage higher than the pre-bias voltage is generated at the input side. At the start of the DC-DC converter 100, the voltage Vss compared with the feedback voltage Vf is low, because of which a ratio of turning on the N-channel MOSFET 111 is high while a ratio of turning on the N-channel MOSFET 110 is low. This results in turning on of the N-channel MOSFET 111 for a long time, which accumulates greater energy on the inductor 120, causing an extremely greater voltage increase at the input side when the regenerative action occurs. Extremely high voltage at the input side leads to such troubles as the breakage of the DC- DC converter 100 and malfunction of an excess voltage protective circuit that monitors the input voltage Vin to the DC-DC converter 100.

For prevention of the regenerative action, a method of stopping switching operation by transistors at the start of a DC-DC converter has been suggested (e.g., "low-input voltage mode synchronous rectification back controller" released by Japan Texas Instruments Incorporated in November 2001, <URL: http//www.tij.co.jp/jsc/ds/SLUS585A.pdf>). The DC-DC converter 100 is provided with a comparator 160 that serves as a circuit that prevents such regenerative action. The comparator 160 compares the feedback voltage Vf with the voltage Vss, and outputs an L level signal when the feedback voltage Vf is higher than the voltage Vss and outputs an H level signal when the feedback voltage Vf is lower than the voltage Vss. In other words, when the feedback voltage Vf is higher than the voltage Vss because of the pre-bias state, the comparator 160 outputs an L level signal. In this case, both N-channel MOSFETs 110 and 111 are controlled to become off in the DC-DC converter 100. As time goes by, the voltage Vss rises, and the feedback voltage Vf becomes lower than the voltage Vss. At this point, the comparator 160 outputs an H level signal, which leads to the start of complementary switching operation by the N-channel MOSFETs 110 and 111.

In recent years, a ripple converter has received much attention as a highly responsive self-exciting DC-DC converter (e.g., Japanese Patent Application Laid-Open Publication No. 2006-14559).

The DC-DC converter 100 needs the comparator 160 to prevent the regenerative action. This brings a demand for a switching control circuit that is smaller in circuit scale and less in cost in comparison with a method using such a comparator.

The present invention was conceived in view of the above problems, and it is therefore the object of the present invention is to provide a switching control circuit that can prevent a regenerative action and that has a small circuit scale.

SUMMARY OF THE INVENTION

According to an aspect of the present invention, a switching control circuit controlling turning on and off of first and second transistors of a DC-DC converter that generates an output voltage at a target level from an input voltage input to the first transistor by complementarily turning on and off the first and second transistors connected in series, comprises: an error amplifying circuit configured to output an error voltage obtained by amplifying an error between a feedback voltage corresponding to the output voltage and a lower voltage selected out of a first reference voltage increasing with time passage and a second reference voltage used as a reference for the target level; a comparison circuit configured to output a comparison signal obtained by comparing the feedback voltage with the error voltage output from the error amplifying circuit; and a drive circuit configured to output first and second control signals for controlling the first and second transistors, respectively, in order to turn the output voltage to the target level by complementarily turning on and off the first and second transistors, after the error voltage exceeds the feedback voltage, based on the comparison signal output from the comparison circuit.

DETAILED DESCRIPTION OF THE INVENTION

FIRST EMBODIMENT

Figure 1:
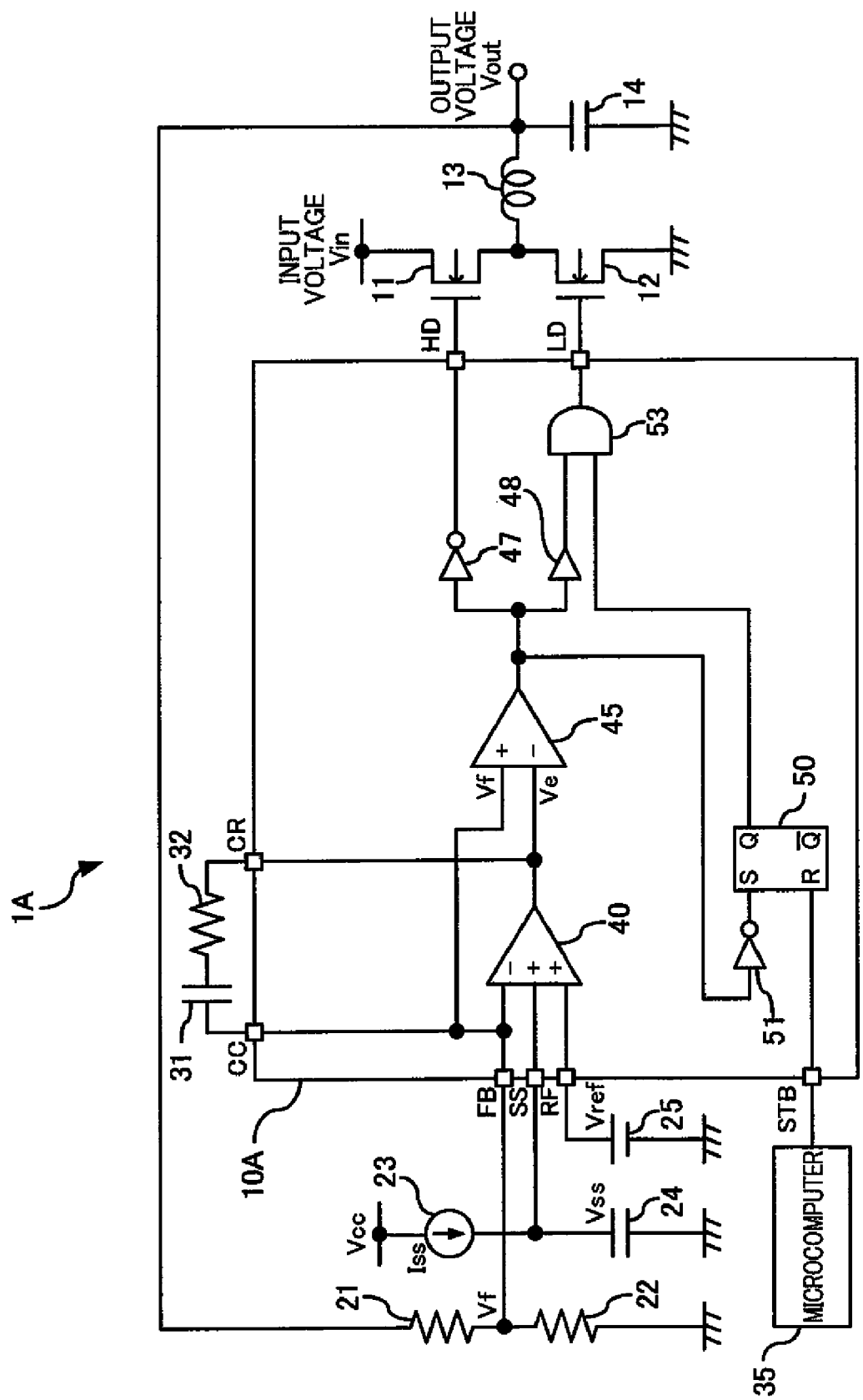
FIG. 1 depicts the configuration of a DC-DC converter incorporating therein a switching control circuit according to a first embodiment of the present invention.

FIG. 1 depicts the configuration of a DC-DC converter incorporating therein a switching control circuit according to a first embodiment of the present invention. The DC-DC converter 1A includes a switching control circuit 10A, N-channel MOSFETs 11 and 12, an inductor 13, a capacitor 14, resistors 21 and 22, a current source 23, a capacitor 24, a power source 25, a capacitor 31, a resistor 32, and a microcomputer 35. The switching control circuit 10A includes an error amplifying circuit 40, a comparator 45, an inverter 47, a buffer 48, an SR flip-flop (hereinafter "SR-FF") 50, an inverter 51, and an AND circuit 53.

The N-channel MOSFET 11 (first transistor) is connected in series to the N-channel MOSFET 12 (second transistor). An input voltage Vin is applied to the drain of the N-channel MOSFET 11, and the source of the N-channel MOSFET 12 is grounded. The gate (control electrode) of the N-channel MOSFET 11 is connected to a terminal HD of the switching control circuit 10A, and the gate (control electrode) of the N-channel MOSFET 12 is connected to a terminal LD of the switching control circuit 10A. While N-channel MOSFETs are used as transistors in the present embodiment, the N-channel MOSFETs may be replaced with P-channel MOSFETs or with bipolar transistors.

The inductor 13 has one end that is connected to a junction between the N-channel MOSFETs 11 and 12, and the other end that is connected to one end of the capacitor 14, the other end of which is grounded. Thus, a voltage at a junction between the inductor 13 and the capacitor 14, that is, a voltage generated by electricity charging the capacitor 14 is equivalent to an output voltage Vout.

The resistors 21 and 22 are the voltage-dividing resistors that generate the feedback voltage Vf corresponding to the output voltage Vout. The resistor 21 has one end to which the output voltage Vout is applied, and the other end connected to one end of the resistor 22, the other end of which is grounded. A voltage at a junction between the resistors 21 and 22 is equivalent to the feedback voltage Vf that is given by dividing the output voltage Vout by a resistance ratio between the resistors 21 and 22. The feedback voltage Vf is applied to a terminal FB of the switching control circuit 10A.

The current source 23 and the capacitor 24 compose a circuit that generates a voltage Vss (first reference voltage) for soft starting the DC-DC converter 1A. The current source 23 is connected to one end of the capacitor 24 so that a current Iss output from the current source 23 flows into the capacitor 24, the other end of which is grounded. A voltage at a junction between the current source 23 and the capacitor 24, that is, a voltage generated by electricity charging the capacitor 24 is equivalent to the voltage Vss for soft start, which is applied to a terminal SS of the switching control circuit 10A.

The power source 25 is the power source that outputs a Vref (second reference voltage) equal in potential to the feedback voltage Vf that is given when the output voltage Vout from the DC-DC converter 1A becomes a voltage at a target level, i.e., target voltage. The Vref output from the power source 25 is applied to a terminal RF of the switching control circuit 10A.

The capacitor 31 and the resistor 32 compose a circuit that causes the error amplifying circuit 40 to make an integral action according to a time constant that is defined by the product of the capacitance C of the capacitor 31 and the resistance value R of the resistor 32. The capacitor 31 has one end connected to a terminal CC of the switching control circuit 10A, and the other end connected to one end of the resistor 32, the other end of which is connected to a terminal CR of the switching control circuit 10A.

The error amplifying circuit 40 has one input terminal with one polarity (negative input terminal in the present embodiment), and two input terminals with the other polarity (positive input terminal in the present embodiment). The feedback voltage Vf is applied to the negative input terminal of the error amplifying circuit 40 via the terminal FB, the voltage Vss is applied to one positive input terminal of the same via the terminal SS, and the voltage Vref is applied to the other positive input terminal of the same via the terminal Rf. The negative input terminal of the error amplifying circuit 40 is connected to the capacitor 31 via the terminal CC, and the output terminal of the error amplifying circuit 40 is connected to the resistor 32 via the terminal CR. The error amplifying circuit 40 outputs an error voltage Ve representing an error between lower one of the voltage Vss and the voltage Vref and the feedback voltage Vf. The error voltage Ve output from the error amplifying circuit 40 changes according to the time constant defined by the capacitor 31 and the resistor 32.

The comparator 45 (comparison circuit) has one input terminal (positive input terminal in the present embodiment) to which the feedback voltage Vf is applied via the terminal FB, and the other input terminal (negative input terminal in the present embodiment) to which the error voltage Ve output from the error amplifying circuit 40 is applied. The comparator 45 compares the feedback voltage Vf applied to the positive input terminal with the error voltage Ve applied to the negative input terminal. The comparator 45 outputs a comparison signal at one logic level (H level in the present embodiment) when the feedback voltage Vf is higher than the error voltage Ve, and outputs a comparison signal at the other logic level (L level in the present embodiment) when the feedback voltage Vf is lower than the error voltage Ve.

The inverter 47 and the buffer 48 compose a circuit that outputs a control signal for complementarily turning on and off the N-channel MOSFETs 11 and 12 based on a comparison signal output from the comparator 45. When the comparison signal output from the comparator 45 is at the logic level indicating that the feedback voltage Vf is higher than the error voltage Ve (H level in the present embodiment), the inverter 47 outputs a control signal (first control signal) at one logic level (L level in the present embodiment) for turning off the N-channel MOSFET 11 (power source side transistor), while the buffer 48 outputs a control signal (second control signal) at the other logic level (H level in the present embodiment) for turning on the N-channel MOSFET 12 (ground side transistor). When the comparison signal output from the comparator 45 is at the logic level indicating that the feedback voltage Vf is lower than the error voltage Ve (L level in the present embodiment), the inverter 47 outputs the control signal (first control signal) at the other logic level (H level in the present embodiment) for turning on the N-channel MOSFET 11 (power source side transistor), while the buffer 48 outputs the control signal (second control signal) at one logic level (L level in the present embodiment) for turning off the N-channel MOSFET 12 (ground side transistor).

The SR-FF50 serves as a circuit that prevents a regenerative action by stopping complementary on/off operation by the N-channel MOSFETs 11 and 12 when a pre-bias state occurs at the start of the DC-DC converter 1A. Controlling current flowing through the coil 13 by complementarily turning on and off the N-channel MOSFETs 11 and 12 is referred to as synchronous rectification. The SR-FF50 outputs a signal for starting synchronous rectification (switching start signal) after the error voltage Ve becomes higher than the feedback voltage Vf. To a set terminal S of the SR-FF50, a comparison signal output from the comparator 45 is input via the inverter 51. To a rest terminal R of the SR-FF50, a stand-by signal output from the microcomputer 35 is input via a terminal STB.

In the present embodiment, the stand-by signal is a pulse signal that comes to an H level at the start of the DC-DC converter 1A. A signal output from an output terminal Q of the SR-FF50 is a signal that indicates permission to or denial of the start of synchronous rectification. In the present embodiment, synchronous rectification is carried out when an H level signal (start signal) is output from the output terminal Q of the SR-FF50. Thus, in the present embodiment, the stand-by signal output from the microcomputer 35 turns a signal output from the SR-FF50 into an L level signal at the start of the DC-DC converter 1A, which leads to execution of regeneration preventive operation. A signal other than the stand-by signal may be used as the signal that turns a signal output from the output terminal Q of the SR-FF50 into an L level signal at the start of the DC-DC converter 1A. For example, a signal output from the output terminal Q of the SR-FF50 may be turned into an L level signal at the start of the DC-DC converter 1A, based on a signal output from a UVLO (Under Voltage Lock Out) circuit for determining on whether a drive voltage for the DC-DC converter 1A has reached a level required for driving the DC-DC converter 1A.

A signal output from the inverter 47 is input to the gate (control electrode) of the N-channel MOSFET 11 via the terminal HD. A signal out put from the buffer 48 is input to one input terminal of the AND circuit 53. A signal output from the output terminal Q of the SR-FF50 is input to the other input terminal of the AND circuit 53. A signal output from the AND circuit 53 is input to the gate (control electrode) of the N-channel MOSFET 12 via the terminal LD. This means that a signal output from the AND circuit 53 is kept at L level regardless of a comparison signal output from the comparator 45 in a period during which an L level signal is output from the output terminal Q of the SR-FF 50, so that synchronous rectification is not carried out in this period.

In the switching control circuit 10A, a combination of the inverter 47, buffer 48, SR-FF50, inverter 51, and AND circuit 53 is equivalent to a drive circuit of the present invention. A combination of the SR-FF50 and inverter 51 is equivalent to a start signal output circuit of the present invention. A combination of the inverter 47 and buffer 48 is equivalent to a control signal output circuit of the resent invention. The AND circuit 53 is equivalent to a drive control circuit of the present invention.

The switching control circuit 10A may be constructed as an integrated circuit, in which case, for example, the current source 23, the power source 25, etc., may be incorporated in the switching control circuit 10A, or the N-channel MOSFETs 11 and 12 may be incorporated in the switching control circuit 10A.

=Description of Operation=

Figure 2:
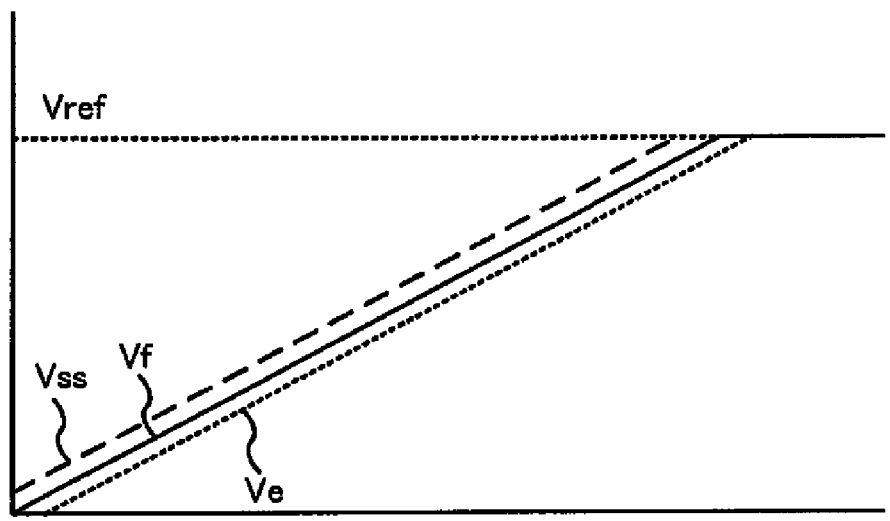
FIG. 2 depicts a voltage change in the DC-DC converter 1A that results when a pre-bias state does not occur at the start of the DC-DC converter 1A.

The operation of the DC-DC converter 1A will be described. The operation to be carried out when the output voltage Vout is at zero level, which means the pre-bias state does not occur, at the start of the DC-DC converter 1A will first be described. FIG. 2 depicts a voltage change in the DC-DC converter 1A that results when the pre-bias state does not occur at the start of the DC-DC converter 1A. When the DC-DC converter 1A is started, the voltage Vss starts rising due to the current Iss output from the current source 23. At this point, the voltage Vss is lower than the voltage Vref, so that the error amplifying circuit 40 amplifies an error between the voltage Vss and the feedback voltage Vf to output the amplified error. Since the voltage Vss is higher than the voltage Vf when the pre-bias state does not occur, the error voltage Ve output from the error amplifying circuit 40 gradually increases following the voltage Vss. As a result, a signal output from the comparator 45 comes to L level, which causes the inverter 47 to output an H level signal and the buffer 48 to output to an L level signal. The L level signal output from the comparator 45 results in an H level signal input to the set terminal S of the SR-FF50. When the H level signal is input to the set terminal S of the SR-FF50, an H level signal is output from the output terminal Q of the SR-FF50. Thus, the level of a signal output from the AND circuit 53 is determined by the level of a signal output from the buffer 48. Now, the inverter 47 outputs the H level signal while the buffer 48 outputs the L level signal. This turns on the N-channel MOSFET 11 and turns off the N-channel MOSFET 12, which causes the output voltage Vout to start rising.

Then, when the rising output voltage Vout causes the feedback voltage Vf to exceed the voltage Vss, the error voltage Ve output from the error amplifying circuit 40 starts to fall. When the error voltage Ve becomes lower than the feedback voltage Vf, a signal output from the comparator 45 comes to H level. When the H level signal is output from the comparator 45, the inverter 47 outputs an L level signal, which turns off the N-channel MOSFET 11. At this time, an H level signal is output from the buffer 48 as the H level signal is output from the output terminal Q of the SR-FF50, so that an H level signal is output from the AND circuit 53. This turns on the N-channel MOSFET 12. As a result, the output voltage Vout starts to fall.

Specifically, when the feedback voltage Vf is lower than the voltage Vss, the N-channel MOSFET 11 becomes on and the N-channel MOSFET 12 becomes off to raise the feedback voltage Vf. When the feedback voltage Vf is higher than the voltage Vss, the N-channel MOSFET 11 becomes off and the N-channel MOSFET 12 becomes on to lower the feedback voltage Vf. In this manner, in the DC-DC converter 1A, the output voltage Vout gradually rises so as to turn the feedback voltage Vf into the voltage Vss through synchronous rectification carried out by complementary turning on and off of the N-channel MOSFETs 11 and 12.

When the Voltage Vss exceeds the voltage Vref, soft start operation ends, after which the error amplifying circuit 40 amplifies an error between the voltage Vref and the feedback voltage Vf to output the amplified error. When the feedback voltage Vf becomes lower than the voltage Vref, the error voltage Ve output from the error amplifying circuit 40 rises to turn a signal output from the comparator 45 into an L level signal. As a result, the N-channel MOSFET 11 is turned on and the N-channel MOSFET 12 is turned off to raise the feedback voltage Vf. When the feedback voltage Vf becomes higher than the voltage Vref, the error voltage Ve output from the error amplifying circuit 40 falls to turn the signal output from the comparator 45 into an H level signal. As a result, the N-channel MOSFET 11 is turned off and the N-channel MOSFET 12 is turned on to lower the feedback voltage Vf. In this manner, in the DC-DC converter 1A, the output voltage Vout becomes a target voltage corresponding to the feedback voltage Vref through synchronous rectification that is carried out to turn the feedback voltage Vf into the voltage Vref.

Figure 3:
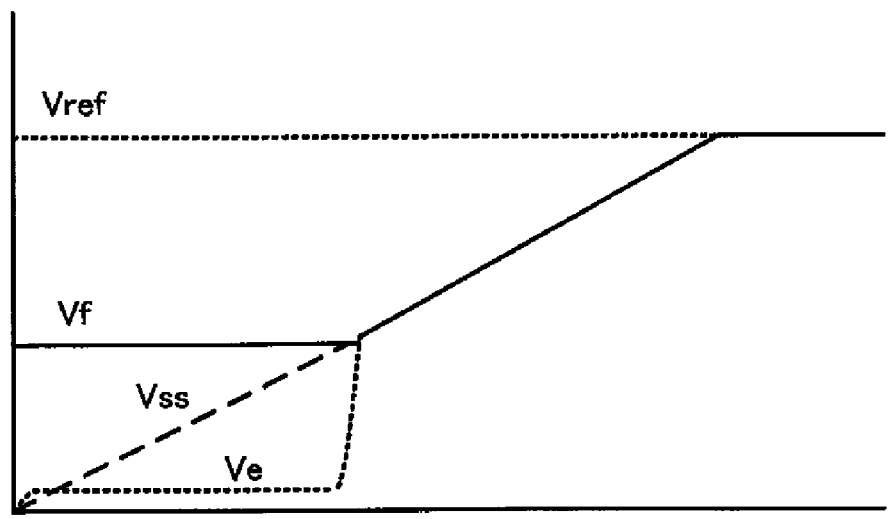
FIG. 3 depicts a voltage change in the DC-DC converter 1A that results when the voltage level of an output voltage Vout is equal to or higher than a zero level to equal to or lower than a target level at the start of the DC-DC converter 1A.

The operation to be carried when the output voltage Vout is not at zero level, which means the pre-bias state occurs, at the start of the DC-DC converter 1A will then be described. FIG. 3 depicts a voltage change in the DC-DC converter 1A that results when the voltage level of the output voltage Vout is equal to or higher than zero level to equal to or lower than a target level at the start of the DC-DC converter 1A. At the start of the DC-DC converter 1A, a stand-by signal output from the microcomputer 35 turns a signal output from the output terminal Q of the SR-FF50 into an L level signal. Meanwhile, the current Iss output from the current source 23 causes the voltage Vss to start rising. At this point, the voltage Vss is lower than the voltage Vref, so that the error amplifying circuit 40 amplifies an error between the voltage Vss and the feedback voltage Vf to output the amplified error. Since the voltage Vf is higher than the voltage Vss in the pre-bias state, the error voltage Ve output from the error amplifying circuit 40 keeps remaining at L level. As a result, a signal output from the comparator 45 stays at H level, which causes the inverter 47 to output an L level signal and the buffer 48 to output an H level signal. The H level signal output from the comparator 45 results in an L level signal input to the set terminal S of the SR-FF50. A signal output from the output terminal Q of the SR-FF50, therefore, remains at L level.

At this time, while the H level signal is output from the buffer 48, the L level signal is output from the output terminal Q of the SR-FF50. This results in output from an L level signal from the AND circuit 53. The L level signal, therefore, is output to both terminals HD and LD, which turns off both N-channel MOSFETs 11 and 12. Hence synchronous rectification is not carried out, which prevents the regenerative action.

Subsequently, when the voltage Vss rises to exceed the feedback voltage Vf, the error voltage Ve output from the error amplifying circuit 40 starts to rise. When the error voltage Ve becomes higher than the feedback voltage Vf, the signal output from the comparator 45 comes to L level. When the L level signal is output from the comparator 45, an H level signal is output from the inverter 47, which turns on the N-channel MOSFET 11. At this time, an L level signal is output from the buffer 48, so that an L level signal is output from the AND circuit 53. This turns off the N-channel MOSFET 12. As a result, the output voltage Vout starts to rise. When the L level signal is output from the comparator 45, an H level signal is input to the set terminal S of the SR-FF50, which results in output of an H level signal from the output terminal Q of the SR-FF50.

Then, when the output voltage Vout rises to cause the feedback voltage Vf to exceed the voltage Vss, the error voltage Ve output from the error amplifying circuit 40 starts to fall. When the error voltage Ve becomes lower than the feedback voltage Vf, the signal output from the comparator 45 comes to H level. When the H level signal is output from the comparator 45, an L level signal is output from the inverter 47, which turns off the N-channel MOSFET 11. At this time, an H level signal is output from the buffer 48 as the H level signal is output from the output terminal Q of the SR-FF50, so that an H level signal is output from the AND circuit 53. This turns on the N-channel MOSFET 12. As a result, the output voltage Vout starts to fall.

Specifically, after a signal output from the output terminal Q of the SR-FF50 comes to H level, that is, after the regeneration preventive operation is canceled, the N-channel MOSFET 11 becomes on and the N-channel MOSFET 12 becomes off to raise the feedback voltage Vf when the feedback voltage Vf is lower than the voltage Vss, and the N-channel MOSFET 11 becomes off and the N-channel MOSFET 12 becomes on to lower the feedback voltage Vf when the feedback voltage Vf is higher than the voltage Vss. In this manner, in the DC-DC converter 1A, the output voltage Vout gradually rises so as to turn the feedback voltage Vf into the voltage Vss through synchronous rectification carried out by complementary turning on and off of the N-channel MOSFETs 11 and 12. Then, when the voltage Vss exceeds the voltage Vref, the error amplifying circuit 40 comes to amplify an error between the voltage Vref and the feedback voltage Vf to output the amplified error. Thus, in the DC-DC converter 1A, the output voltage Vout becomes the target voltage corresponding to the voltage Vref through synchronous rectification carried out to turn the feedback voltage Vf into the voltage Vref.

As described above, in the DC-DC converter 1A, the regeneration preventive operation is controlled based on a comparison signal output from the comparator 45. In other words, the comparator 45 offers a function of generating a signal for controlling synchronous rectification and a function of generating a signal for canceling the regeneration preventive operation in the DC-DC converter 1A. The DC-DC converter 1A, therefore, does not need a dedicated comparator for carrying out the regeneration preventive operation. This enables a reduction in the circuit scale of the switching control circuit 10A.

In the DC-DC converter 1A, at the start of synchronous rectification following cancellation of the regeneration preventive operation, the N-channel MOSFET 11 is turned on first before turning on the N-channel MOSFET 12. If the N-channel MOSFET 12 were turned on first at the start of synchronous rectification, the output voltage Vout would fall until the N-channel MOSFET 11 is turned on. The DC-DC converter 1A, however, ensures that the N-channel MOSFET 11 is turned on first, thus suppresses a drop in the output voltage Vout at the start of synchronous rectification.

SECOND EMBODIMENT

=Circuit Configuration=

Figure 4:
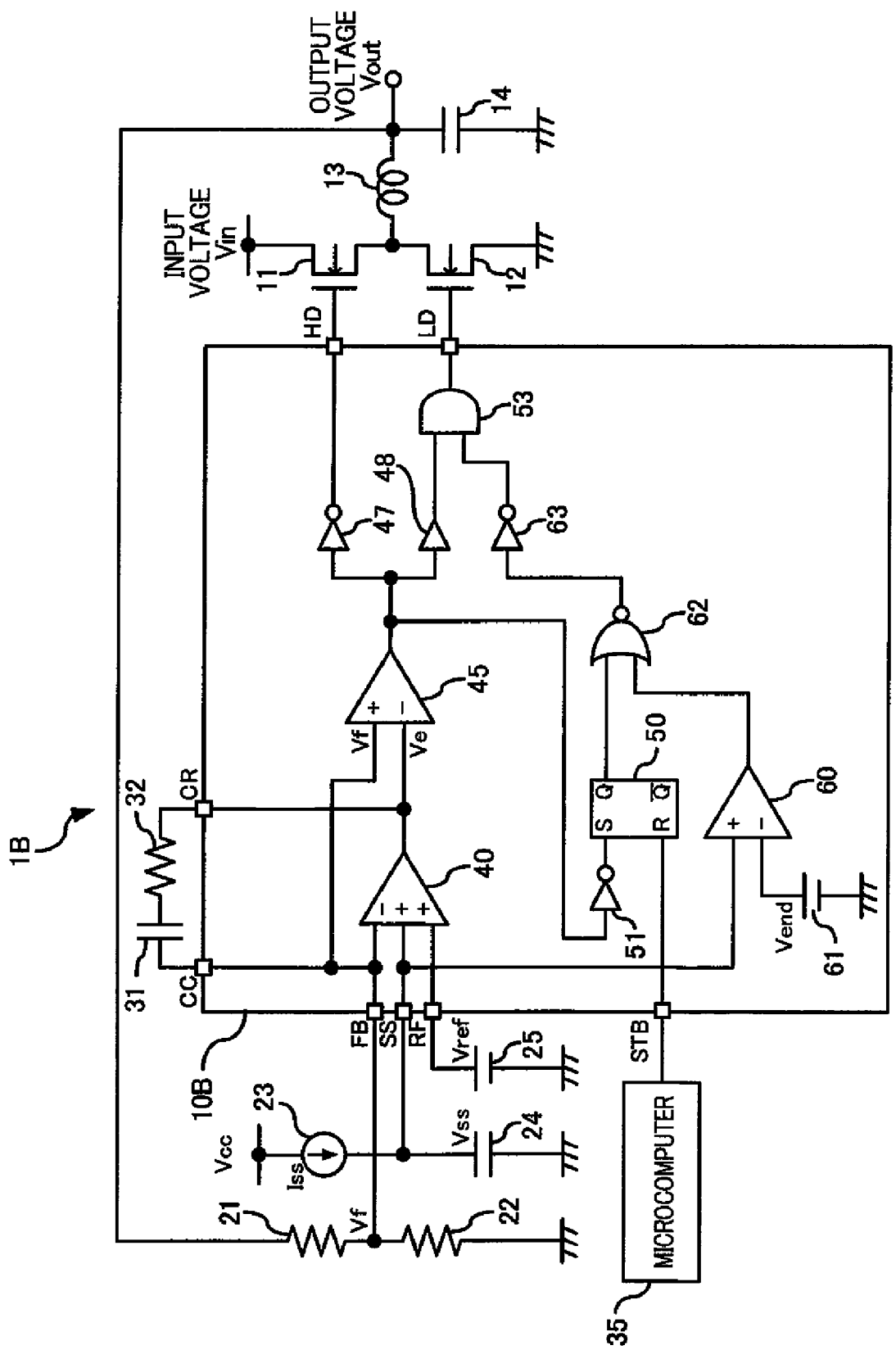
FIG. 4 depicts the configuration of a DC-DC converter incorporating therein a switching control circuit according to a second embodiment of the present invention.

FIG. 4 depicts the configuration of a DC-DC converter incorporating therein a switching control circuit according to a second embodiment of the present invention. The DC-DC converter 1B is provided with a switching control circuit 10B in replacement of the switching control circuit 10A of the DC-DC converter 1A of the first embodiment. The switching control circuit 10B includes a comparator 60 (reference voltage comparison circuit), a power source 61, a NOR circuit 62, and an inverter 63, in addition to the components of the switching control circuit 10A.

The comparator 60 is the circuit that forcibly cancels the regeneration preventive operation in the switching control circuit 10B. For example, such a case is assumed that the output voltage Vout is higher than the target voltage when the DC-DC converter of the first embodiment is in the pre-bias state. In this case, the feedback voltage Vf is higher than the voltage Vref, so that a signal output from the comparator 45 remains at H level. Because of this, a signal output from the output terminal Q of the SR-FF50 remains at L level, which prevents the start of synchronous rectification. As a result, the output voltage Vout continues to be higher than the target voltage. To prevent this situation, the DC-DC converter 1B is equipped with the comparator 60 to offer a function of forcibly canceling the regeneration preventive operation following the end of soft start operation.

The comparator 60 has one input terminal (positive input terminal in the present invention) to which the voltage Vss is applied via the terminal SS, and the other input terminal (negative input terminal in the present invention) to which a voltage Vend output from the power source 61 is applied. The comparator 60 compares the voltage Vss applied to the positive input terminal with the voltage Vend applied to the negative input terminal, and outputs a comparison signal at one logic level (H level in the present embodiment) when the voltage Vss is higher than the voltage Vend and outputs a comparison signal at the other logic level (L level in the present embodiment) when the voltage Vss is lower than the voltage Vend. The power source 61 may be disposed at the outside of the switching control circuit 10B.

The voltage Vend is the voltage for detection of the end of soft start operation, and is set higher than the voltage Vref. When the voltage Vss becomes higher than the voltage Vend to causes the comparator 60 to output an H level signal, the end of soft start operation is concluded, which leads to cancellation of the regeneration preventive operation. It is preferable that the voltage Vend be not identical with the Voltage Vref but be slightly higher than the Voltage Vref so that the regeneration preventive operation is canceled in proper timing surely after the end of soft start operation.

The NOR circuit 62 has one input terminal to which a signal output from the output terminal Q of the SR-FF50 is input, and the other input terminal to which a signal output from the comparator 60 is input. When either the signal from the output terminal Q of the SR-FF50 or the signal from the comparator 60 comes to H level, therefore, a signal output from the NOR circuit 62 comes to L level. The signal output from the NOR circuit 62 is input to the AND circuit 53 via the inverter circuit 63 as a signal output from the buffer 48 is input to the AND circuit 53.

In the switching control circuit 10B, a combination of the inverter 47, buffer 48, SR-FF50, inverter 51, AND circuit 53, NOR circuit 62, and inverter 63 is equivalent to the drive circuit of the present invention. A combination of the SR-FF50 and inverter 51 is equivalent to the start signal output circuit of the present invention. A combination of the inverter 47 and buffer 48 is equivalent to the control signal output circuit of the present invention. A combination of the AND circuit 53, NOR circuit 62, and inverter 63 is equivalent to the drive control circuit of the present invention.

=Description of Operation=

Operation of the DC-DC converter 1B will be described. The regeneration preventive operation is not carried out when the pre-bias state does not occur, in which case, therefore, the DC-DC converter 1B operates in the same manner as the DC-DC converter 1A of the first embodiment operates. When the feedback voltage Vf is lower than the voltage Vref in the pre-bias state, the voltage Vss rises through soft start operation. When the voltage Vss becomes higher than the voltage Vf, a signal output from the output terminal Q of the SR-FF50 comes to H level in the same manner as in the DC-DC converter 1A of the first embodiment. When the H level signal is output from the output terminal Q of the SR-FF 50, an H level signal is output from the inverter 63, which cancels the regeneration preventive operation.

When the feedback voltage Vf is higher than the voltage Vref in the pre-bias state, a signal output from the comparator 45 remains at H level even after the end of soft start operation. Because of this, a signal output from the output terminal Q of the SR-FF 50 remains at L level, so that the regeneration preventive operation is not canceled by the signal from the output terminal Q of the SR-FF 50. When the voltage Vss becomes higher than the voltage Vend, however, a signal output from the comparator 60 comes to H level, because of which a signal output from the NOR circuit 62 comes to L level. Thus, an H level signal is output from the inverter 63. As a result, the regeneration preventive operation is canceled forcibly regardless of the level of a signal output from the comparator 45.

As described above, in the DC-DC converter 1B, the regeneration preventive operation is controlled based on a comparison signal output from the comparator 45 in the same manner as in the DC-DC converter 1A of the first embodiment. The DC-DC converter 1B, therefore, does not need a dedicated comparator for carrying out the regeneration preventive operation, enabling a reduction in the circuit scale of the switching control circuit 10B. In addition, according to the DC-DC converter 1B, the regeneration preventive operation is canceled forcibly when the feedback voltage Vf is higher than the voltage Vref even after the end of soft start operation. The output voltage Vout, therefore, does not continue to be higher than the target voltage. This reduces an effect on a circuit supplied with the output voltage Vout.

THIRD EMBODIMENT

=Circuit Configuration=

Figure 5:
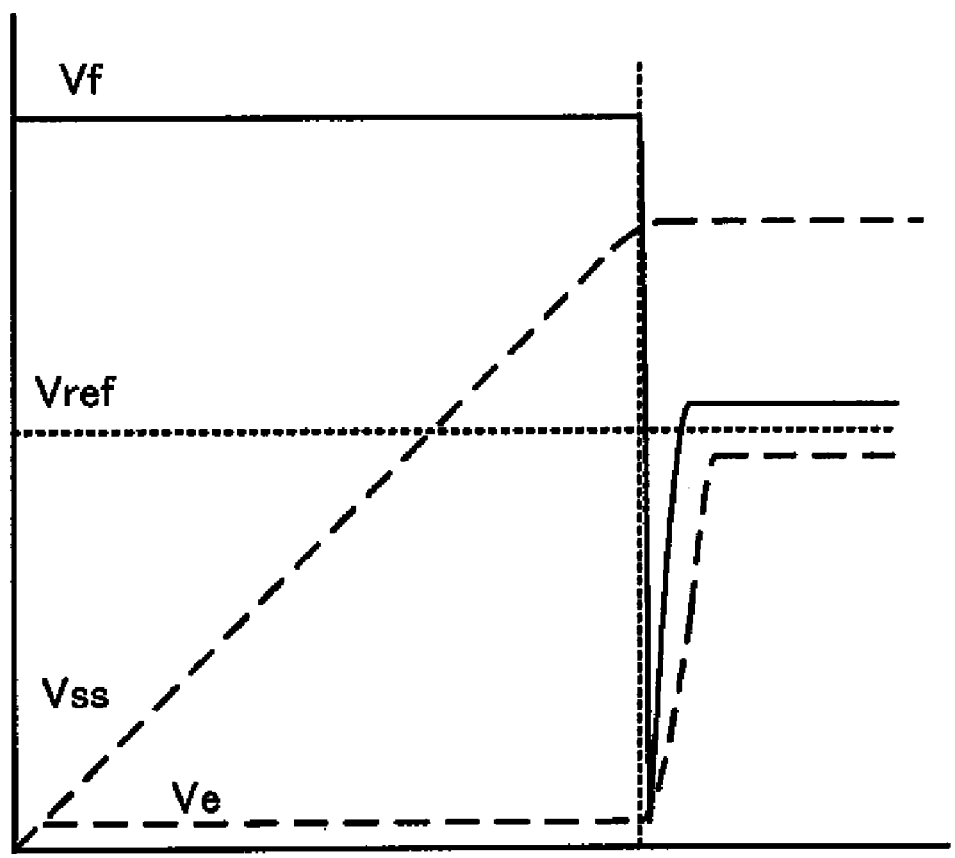
FIG. 5 depicts a voltage change in the DC-DC converter 1B that results when a feedback voltage Vf is higher than a voltage Vref in the pre-bias state.

In the DC-DC converter 1B of the second embodiment, the output voltage Vout drops temporarily when the regeneration preventive operation is canceled forcibly. FIG. 5 depicts a voltage change in the DC-DC converter 1B that results when the feedback voltage Vf is higher than the Voltage Vref in the pre-bias state. Since the feedback voltage Vf is higher than the Voltage Vref, the error voltage Ve output from the error amplifying circuit 40 keeps remaining at L level even when the voltage Vss rises. Subsequently, as described above, when the voltage Vss becomes higher than the voltage Vend, the comparator 60 outputs an H level signal, which forcibly cancels the regeneration preventive operation, thus leading to the start of synchronous rectification.

At this time, the voltage Ve output from the error amplifying circuit 40 remains at L level. A signal output from the comparator 45, therefore, comes to H level, so that the N-channel MOSFET 11 becomes off while the N-channel MOSFET 12 becomes on. This causes the output voltage Vout to start falling. When the feedback voltage Vf becomes lower than the Voltage Vref as a result of a fall in the output voltage Vout, the error voltage Ve output from the error amplifying voltage 40 starts to rise. The error amplifying voltage 40, however, makes the integral action according to the integral constant defined by the capacitor 31 and the resistor 32, thus not allowing the error voltage Ve to rise immediately. For this reason, in the DC-DC converter 1B, the output voltage Vout temporarily drops to a voltage level close to zero level. Afterward, as the error voltage Ve rises, the signal output from the comparator 45 comes to L level, so that the N-channel MOSFET 11 becomes on while the N-channel MOSFET 12 becomes off. Hence the output voltage Vout rises so as to turn the feedback voltage Vf into the Voltage Vref.

In this manner, in the DC-DC converter 1B of the second embodiment, the output voltage Vout falls when the regeneration preventive operation is canceled forcibly. For a circuit supplied with the output voltage Vout, suppression of the fall in the output voltage Vout at the time of forcible cancellation of the regeneration preventive operation may be preferable, as shown in the following third embodiment.

Figure 6:
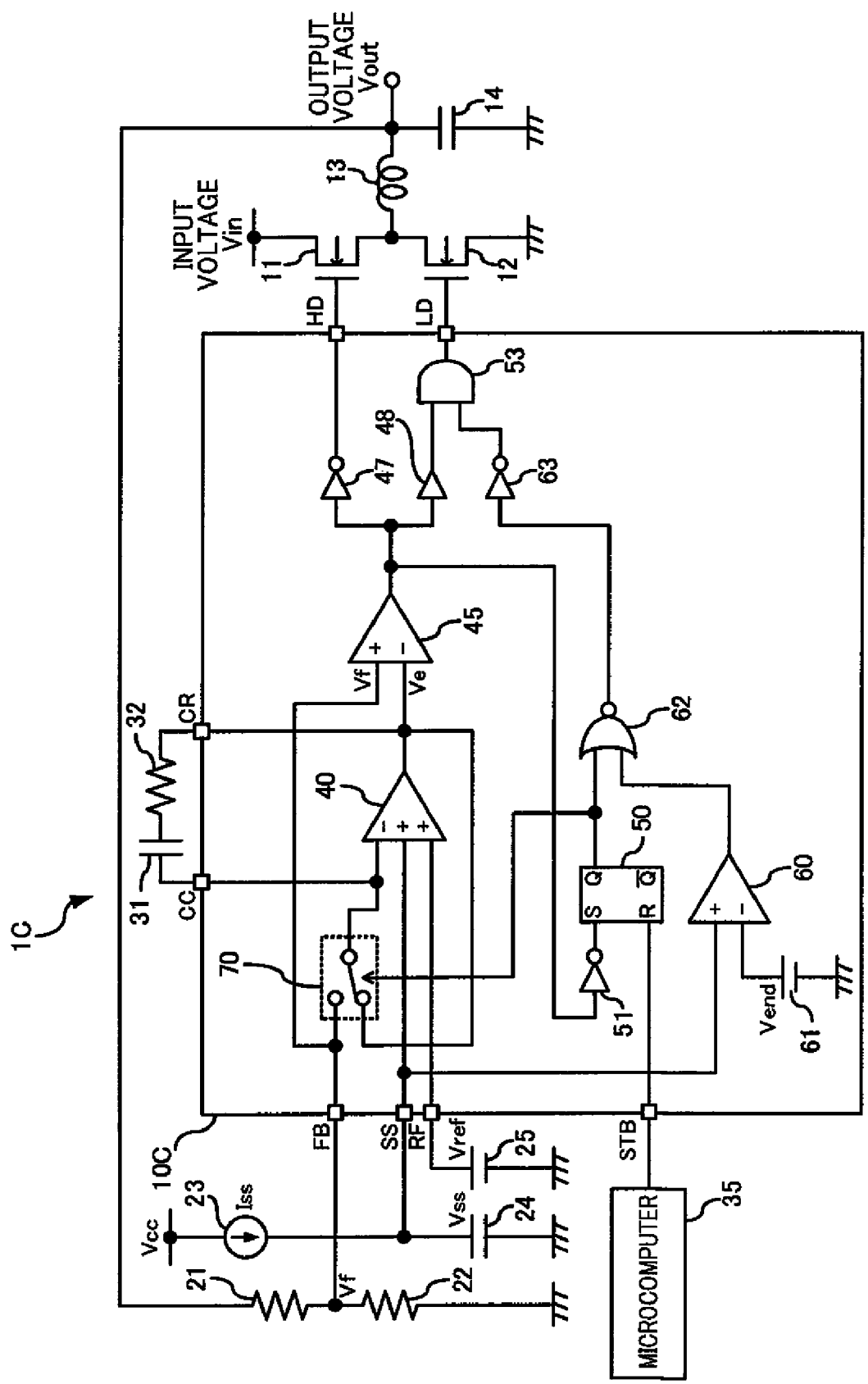
FIG. 6 depicts the configuration of a DC-DC converter incorporating therein a switching control circuit according to a third embodiment of the present invention.

FIG. 6 depicts the configuration of a DC-DC converter incorporating therein a switching control circuit according to the third embodiment of the present invention. The DC-DC converter 1C is provided with a switching control circuit 10C in replacement of the switching control circuit 10B of the DC-DC converter 1B of the second embodiment. The switching control circuit 10C has a function of suppressing a wide fall in the output voltage Vout at the time of forcible cancellation of the regeneration preventive operation, and includes a switch circuit 70 (error voltage control circuit), in addition to the components of the switching control circuit 10B.

The switch circuit 70 is capable of switching a voltage applied to the negative input terminal of the error amplifying circuit 40 in response to a signal output from the output terminal Q of the SR-FF 50. Specifically, when the signal output from the output terminal Q of the SR-FF 50 is at one logic level (L level in the present embodiment) indicating execution of the regeneration preventive operation, the switch circuit 70 electrically connects the output terminal of the error amplifying circuit 40 to the negative input terminal of the same to input the error voltage Ve to the negative input terminal. In this case, the error voltage Ve becomes equal in potential to lower one of the voltage Vss and the voltage Vref. In other words, the error amplifying circuit 40 works as a buffer circuit that outputs lower one of the voltage Vss and the voltage Vref. When the signal output from the output terminal Q of the SR-FF 50 is at the other logic level (H level in the present embodiment) indicating cancellation of the regeneration preventive operation, the switch circuit 70 electrically connects the terminal FB to the negative input terminal of the amplifying circuit 40 to input the feedback voltage Vf to the negative input terminal.

In the switching control circuit 10C, a combination of the inverter 47, buffer 48, SR-FF 50, inverter 51, AND circuit 53, NOR circuit 62, and inverter 63 is equivalent to the drive circuit of the present invention. A combination of the SR-FF 50 and inverter 51 is equivalent to the start signal output circuit of the present invention. A combination of the inverter 47 and buffer 48 is equivalent to the control signal output circuit of the present invention. A combination of the AND circuit 53, NOR circuit 62, and inverter 63 is equivalent to the drive control circuit of the present invention.

=Description of Operation=

Operation of the DC-DC converter 1C will be described. The operation to be carried out when the pre-bias state does not occur will first be described. When the DC-DC converter 1C is started, a stand-by signal output from the microcomputer 35 turns a signal output from the output terminal Q of the SR-FF 50 into an L level signal. In response to the L level signal output from the output terminal Q of the SR-FF 50, the switch circuit 70 electrically connects the output terminal of the error amplifying circuit 40 to the negative input terminal of the same, which means that the positive terminals and negative terminal of the error amplifying circuit 40 are put in a short-circuited state. Since the voltage Vss is lower than the voltage Vref at the start of the DC-DC converter 1C, the error voltage Ve output from the output terminal of the error amplifying circuit 40 becomes equal in potential to the voltage Vss. As the voltage Vss rises gradually, the error voltage Ve becomes higher than the feedback voltage Vf. Because of this, a signal output from the comparator 45 comes to L level, which changes the signal output from the output terminal Q of the SR-FF50 into an H level signal. When the signal output from the output terminal Q of the SR-FF50 is changed into the H level signal, the switch circuit 70 electrically connects the terminal FB to the negative input terminal of the error amplifying circuit 40. Afterward, synchronous rectification is carried out so as to turn the feedback voltage Vf into lower one of the voltage Vss and the voltage Vref.

Operation to be carried out when the feedback voltage Vf is lower than the Voltage Vref in the pre-bias state will then be described. At the start of the DC-DC converter IC, as in the above case, a stand-by signal output from the microcomputer 35 turns a signal output from the output terminal Q of the SR-FF50 into an L level signal. In response to the L level signal output from the output terminal Q of the SR-FF50, the switch circuit 70 electrically connects the output terminal of the error amplifying circuit 40 to the negative input terminal of the same. Because of this, the error voltage Ve output from the output terminal of the error amplifying circuit 40 becomes equal in potential to the voltage Vss. At this time, the feedback voltage Vf is higher than the voltage Vss under the pre-bias state, so that a signal output from the comparator 45 is at H level, which keeps the signal output from the output terminal Q of the SR-FF50 at L level. As a result, the regeneration preventive operation is carried out in the DC-DC converter 1C.

Then, the error voltage Ve output from the error amplifying circuit 40 rises as the voltage Vss rises. When the error voltage Ve becomes higher than the feedback voltage Vf, the signal output from the comparator 45 comes to L level, which means that when the voltage Vss exceeds the feedback voltage Vf to cause cancellation of the pre-bias state, the signal output from the comparator 45 comes to L level. When the signal output from the comparator 45 comes to L level, the signal output from the output terminal Q of the SR-FF50 comes to H level, which leads to cancellation of the regenerative preventive operation. Afterward, synchronous rectification is carried out so as to bring the feedback voltage Vf equal in potential to lower one of the voltage Vss and the voltage Vref.

Figure 7:
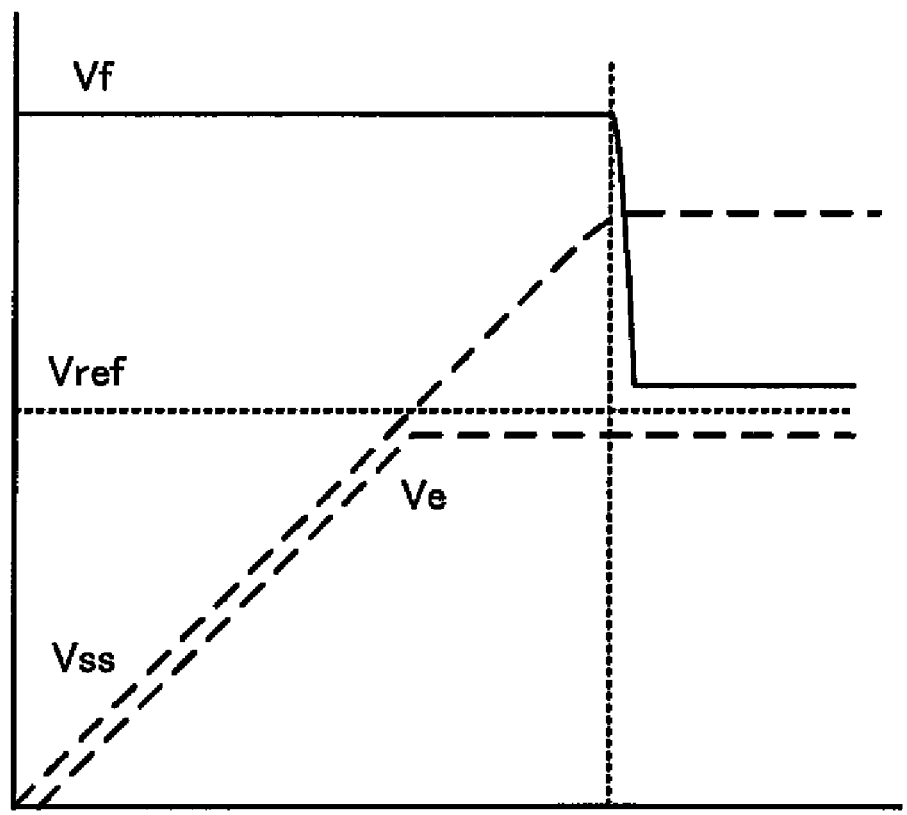
FIG. 7 depicts a voltage change in the DC-DC converter 1C that results when the feedback voltage Vf is higher than the Voltage Vref in the pre-bias state.
Figure 8:
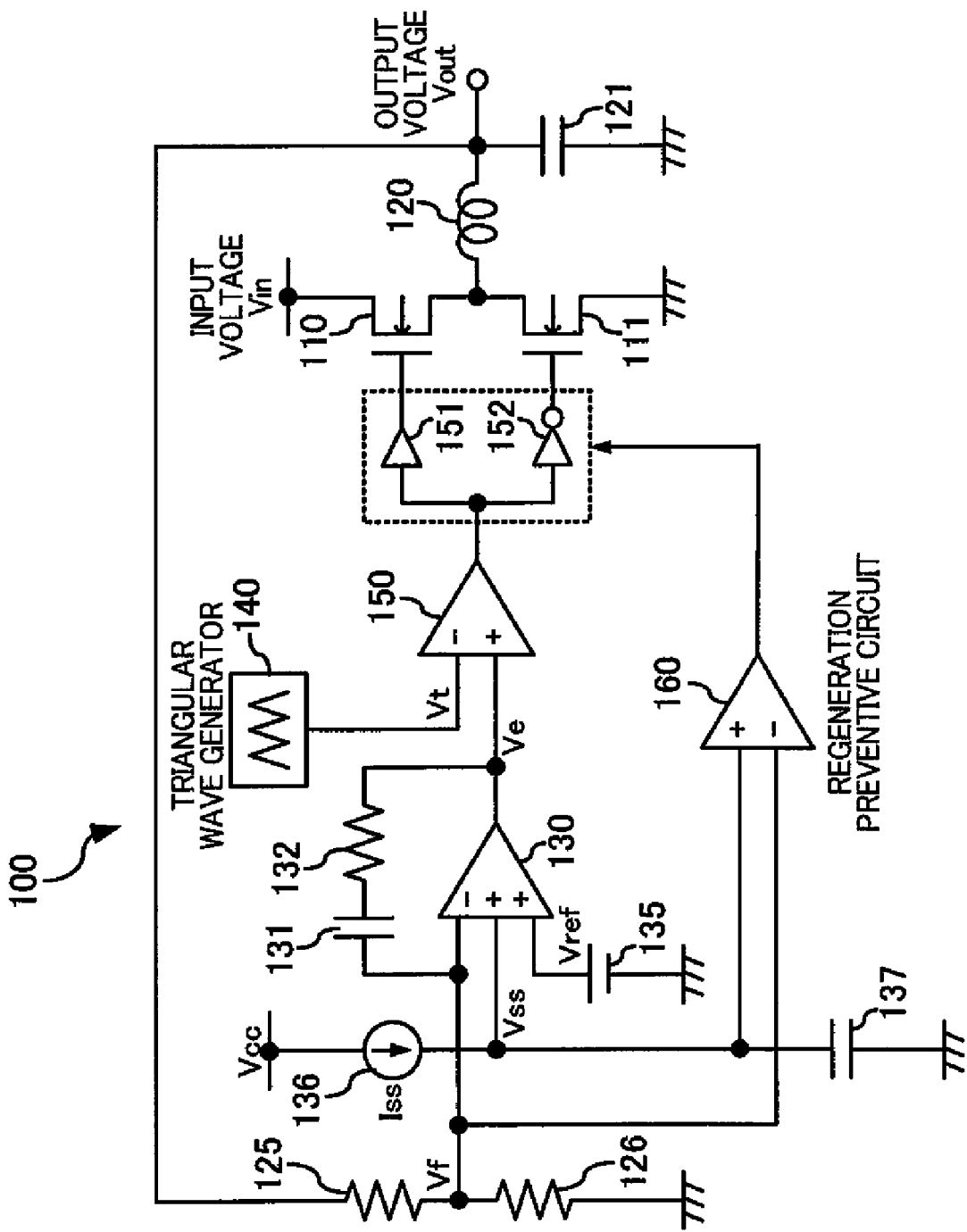
FIG. 8 depicts the general configuration of a step-down DC-DC converter.

Operation to be carried out when the feedback voltage Vf is higher than the Voltage Vref in the pre-bias state will then be described. FIG. 7 depicts a voltage change in the DC-DC converter 1C that results when the feedback voltage Vf is higher than the Voltage Vref in the pre-bias state. At the start of the DC-DC converter 1C, as in the above case, a stand-by signal output from the microcomputer 35 turns a signal output from the output terminal Q of the SR-FF50 into an L level signal. In response to the L level signal output from the output terminal Q of the SR-FF50, the switch circuit 70 electrically connects the output terminal of the error amplifying circuit 40 to the negative input terminal of the same. Because of this, the error voltage Ve output from the output terminal of the error amplifying circuit 40 becomes equal in potential to the voltage Vss. At this time, the feedback voltage Vf is higher than the voltage Vss under the pre-bias state, so that a signal output from the comparator 45 is at H level, which keeps the signal output from the output terminal Q of the SR-FF50 at L level. As a result, the regeneration preventive operation is carried out in the DC-DC converter 1C.

Then, when the voltage Vss rises to exceed the voltage Vref, the voltage Ve output from the output terminal of the error amplifying circuit 40 becomes equal in potential to the voltage Vref. At this point, the feedback voltage Vf is higher than the voltage Vref, so that the signal output from the comparator 45 remains at H level. The signal output from the output terminal Q of the SR-FF50, therefore, remains at L level. As a result, the regeneration preventive operation is continued in the DC-DC converter 1C.

Afterward, when the voltage Vss keeps rising to become higher than the voltage Vend output from the power source 61, a signal output from the comparator 60 comes to H level, which results in forcible cancellation of the regeneration preventive operation. At this time, the voltage Ve output from the error amplifying circuit 40 is equal in potential to the voltage Vref because the error amplifying circuit 40 is working as a buffer circuit. For this reason, synchronous rectification is carried out so as to turn the feedback voltage Vf into the voltage Vref immediately after cancellation of the regeneration preventive operation. This suppresses a wide fall in the output voltage Vout.

As set forth in the above description of the first to third embodiments, the regeneration preventive operation is controlled based on a comparison signal output from the comparator 45 in the DC-DC converters 1A, 1B, and 1C. In other words, the comparator 45 offers a function of generating a signal for controlling synchronous rectification and a function of generating a signal for canceling the regeneration preventive operation in the DC-DC converters 1A, 1B, and 1C. The DC-DC converters 1A, 1B, and 1C, therefore, do not need a dedicated comparator for carrying out the regeneration preventive operation. This enables a reduction in the circuit scale of the switching control circuit 10A, 10B, and 10C.

In the DC-DC converters 1A, 1B, and 1C, the N-channel MOSFET 11 is turned on first before turning on the N-channel MOSFET 12 at the start of synchronous rectification following cancellation of the regeneration preventive operation. This suppresses a fall in the output voltage Vout at the start of synchronous rectification.

In the DC-DC converters 1A, 1B, and 1C, as shown in the second and third embodiments, the regeneration preventive operation is forcibly canceled when the feedback voltage Vf is higher than the voltage Vref even after the end of soft start. Even when the output voltage Vout is higher than the target voltage in the pre-bias state, therefore, the regeneration preventive operation is canceled forcibly after the end of soft start operation. This prevents the continuation of a state where the output voltage Vout is higher than the target voltage, allowing the output voltage Vout to change into the target voltage.

In the DC-DC converters 1C, as shown in the third embodiment, the error amplifying circuit 40 works as the buffer circuit that outputs lower one of the voltage Vss and the voltage Vref. Because of this, the error voltage Ve output from the error amplifying circuit 40 becomes equal in potential to the voltage Vref at forcible cancellation of the regeneration preventive operation. This suppresses a wide fall in the output voltage Vout.

The above embodiments of the present invention are simply for facilitating the understanding of the present invention and are not in any way to be construed as limiting the present invention. The present invention may variously be changed or altered without departing from its spirit and encompass equivalents thereof.

It is claimed:

1. A switching control circuit controlling turning on and off of first and second transistors of a DC-DC converter that generates an output voltage at a target level from an input voltage input to the first transistor by complementarily turning on and off the first and second transistors connected in series, the switching control circuit comprising:
    an error amplifying circuit configured to output an error voltage obtained by amplifying an error between a feedback voltage corresponding to the output voltage and a lower voltage selected out of a first reference voltage increasing with time passage and a second reference voltage used as a reference for the target level;

a comparison circuit configured to output a comparison signal obtained by comparing the feedback voltage with the error voltage output from the error amplifying circuit; and a drive circuit configured to output first and second control signals for controlling the first and second transistors, respectively, in order to turn the output voltage to the target level by complementarily turning on and off the first and second transistors, after the error voltage exceeds the feedback voltage, based on the comparison signal output from the comparison circuit.

2. The switching control circuit of claim 1, wherein the drive circuit starts outputting the first and second control signals so as to turn on the first transistor before turning on the second transistor.

3. The switching control circuit of claim 2, wherein the drive circuit includes:

a start signal output circuit configured to output a switching start signal for starting output of the first and second control signals when the error voltage exceeds the feedback voltage, based on the comparison signal output from the comparison circuit;

a control signal output circuit configured to output the first and second control signals for turning off the first transistor and turning on the second transistor when the feedback voltage is higher than the error voltage, and to output the first and second control signals for turning on the first transistor and turning off the second transistor when the feedback voltage is lower than the error voltage, based on the comparison signal output from the comparison circuit; and a drive control circuit configured to output the second control signal output from the drive circuit for turning on the second transistor to the second transistor when receiving input of the switching start signal from the start signal output circuit.

4. The switching control circuit of claim 1, wherein the drive circuit starts outputting the first and second control signals regardless of the comparison signal output from the comparison circuit when the first reference voltage exceeds a given voltage equal to or higher than the second reference voltage.

5. The switching control circuit of claim 3, further comprising a reference voltage comparison circuit configured to output a comparison signal obtained by comparing the first reference voltage with a given voltage equal to or higher than the second reference voltage, wherein the start signal output circuit outputs the switching start signal when the error voltage exceeds the feedback voltage or the first reference voltage exceeds the given voltage, based on the comparison signal output from the comparison circuit and on the comparison signal output from the reference voltage comparison circuit.

6. The switching control circuit of claim 4, further comprising an error voltage control circuit configured to render the error voltage output from the error amplifying circuit as being a lower voltage selected out of the first and second reference voltages, up until the drive circuit starts outputting the first and second control signals.

7. The switching control circuit of claim 6, wherein the error voltage control circuit includes a switch circuit configured to apply the error voltage in replacement of the feedback voltage to an input terminal of the error amplifying circuit to which the feedback voltage is to be applied, up until the drive circuit starts outputting the first and second control signals.

8. The switching control circuit of claim 5, further comprising a switch circuit configured to apply either the feedback voltage or the error voltage to the input terminal of the error amplifying circuit to which the feedback voltage is to be applied, wherein the start signal output circuit raises the error voltage to a voltage corresponding to a lower voltage selected out of the first and second reference voltages by applying the error voltage to the input terminal via the switch circuit when the error voltage is lower than the feedback voltage, and applies the feedback voltage to the input terminal via the switch circuit when the error voltage is higher than the feedback voltage, based on the comparison signal output from the comparison circuit.

* * * * *